(12) United States Patent
Sawaguchi

(10) Patent No.: US 7,076,721 B2
(45) Date of Patent: *Jul. 11, 2006

(54) DATA RECORDING/READBACK METHOD AND DATA RECORDING/READBACK DEVICE FOR THE SAME

(75) Inventor: Hideki Sawaguchi, Tokyo (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 130 days.

This patent is subject to a terminal disclaimer.

(21) Appl. No.: 10/693,970

(22) Filed: Oct. 28, 2003

(65) Prior Publication Data

US 2004/0158791 A1    Aug. 12, 2004

Related U.S. Application Data

(63) Continuation of application No. 09/549,929, filed on Apr. 14, 2000, now Pat. No. 6,668,349.

(51) Int. Cl.
*H03M 13/29* (2006.01)
(52) U.S. Cl. .................................. 714/755; 714/769
(58) Field of Classification Search ............ 714/755, 714/769
See application file for complete search history.

(56) References Cited

U.S. PATENT DOCUMENTS

| 4,336,612 A | 6/1982 | Inoue et al. ............ 714/755 |
| 5,511,081 A | 4/1996 | Hagenauer .............. 714/795 |

(Continued)

FOREIGN PATENT DOCUMENTS

JP        11-168514        6/1999

OTHER PUBLICATIONS

Oberg, M., et al., "Parity Check Codes for Partial Response Channels", IEEE Globecom '99, 1999, pp. 717-722.*

(Continued)

*Primary Examiner*—Stephen M. Baker
(74) *Attorney, Agent, or Firm*—Mattingly, Stanger, Malur & Brundidge, P.C.

(57) ABSTRACT

The present invention discloses an information processing method including the following steps:
(1) a first step receiving an encoded information data series as input;
(2) a second step selecting a candidate decoded data code series from a first candidate decoded data code series group, decoding the encoded information data series, and generating a first decoded data code series;
(3) a third step detecting a position and contents of erroneous decoded data codes in the first decoded data code series that cannot exist in the information data code;
(4) a fourth step correcting the erroneous decoded data code and generating a corrected data code;
(5) a fifth step selecting a single decoded data code series out of a second candidate decoded data code series group, decoding the encoded information data code series again, and generating a second decoded data code series;
(6) The second candidate decode data code series group includes candidate decoded data code series from the first candidate decoded data code series group that fulfills at least one of the following conditions:
1. A candidate decoded data code series that does not contain erroneous decoded data codes that were detected at the third step and that could not be corrected at the fourth step.
2. A candidate data code series that contains: data codes that were determined at the third step to not contain erroneous decoded data codes; and corrected data codes corrected at the fourth step.

14 Claims, 13 Drawing Sheets

U.S. PATENT DOCUMENTS

| | | | |
|---|---|---|---|
| 5,673,291 A | 9/1997 | Dent | 375/262 |
| 5,983,383 A | 11/1999 | Wolf | 714/755 |
| 6,029,264 A | 2/2000 | Kobayashi et al. | 714/755 |
| 6,043,946 A | 3/2000 | Genheimer et al. | 360/53 |
| 6,047,398 A | 4/2000 | Okayama et al. | 714/764 |
| 6,134,065 A | 10/2000 | Bergmans et al. | 360/53 |
| 6,405,342 B1 | 6/2002 | Lee | 714/792 |
| 6,430,724 B1 | 8/2002 | Laneman et al. | 714/780 |
| 6,516,136 B1 * | 2/2003 | Lee | 386/124 |
| 6,668,349 B1 * | 12/2003 | Sawaguchi | 714/755 |
| 6,690,739 B1 * | 2/2004 | Mui | 375/265 |
| 6,732,328 B1 * | 5/2004 | McEwen et al. | 714/795 |
| 6,795,947 B1 * | 9/2004 | Siegel et al. | 714/802 |
| 6,873,665 B1 * | 3/2005 | Kobayashi et al. | 375/341 |

OTHER PUBLICATIONS

McPheters, L., et al., "Precoded PRML, Serial Concatenation, and Iterative (Turbo) Decoding for Digital Magnetic Recording", IEEE Transactions on Magnetics, vol. 35, No. 5, Sep. 1999, pp. 2325-2327.*

Paaske, "Improved Decoding for a Concatenated Coding System Recommended by CCSDS", IEEE Transactions on Communications, vol. 38, No. 8, Aug. 1990, pp. 1138-1144.

Aitsab et al, "Performance of Concatenated Reed-Solomon/Convolutional Codes with Iterative Decoding", GLOBECOM '97, pp. 934-938.

Bajcsy et al, "Iterative Decoding with Erasures in a Concatenated System with Diversity", ISCC '98, pp. 100-104.

Bajcsy et al, "Iterative Decoding for Digital Recording Systems", GLOBECOM '98, pp. 2700-2705.

"PRML System for Digital Magnetic Recording", IEEE Journal on Selected Areas on Communication, vol. 10, No. 1, 1992.

* cited by examiner

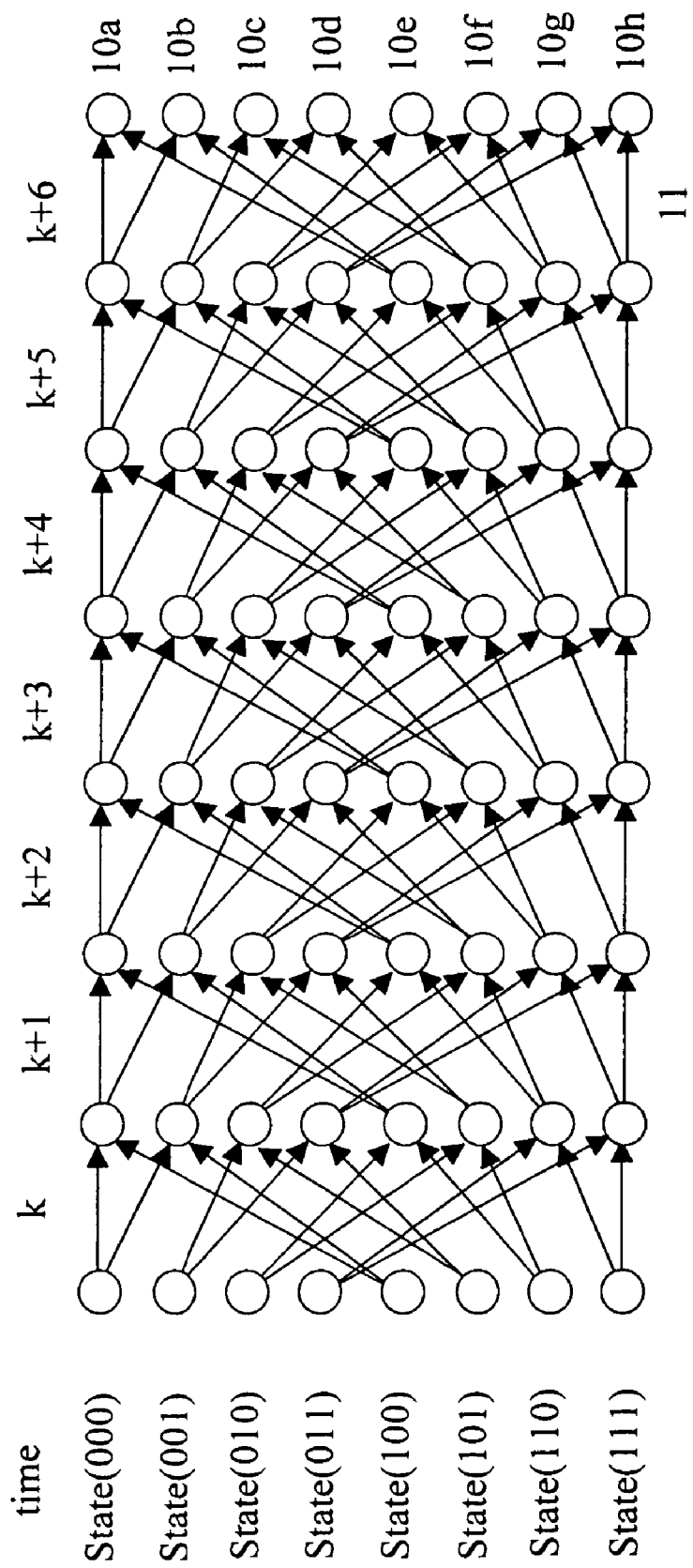

DATA RECORDING/READBACK METHOD AND DATA RECORDING/READBACK DEVICE FOR THE SAME

This is a continuation application of U.S. Ser. No. 09/549,929, filed Apr. 14, 2000 now U.S. Pat. No. 6,668,349.

BACKGROUND OF THE INVENTION

The present invention relates to a technology for implementing a recording/readback device and a recording/readback circuit for performing high-density data storage.

In high-density data recording/readback devices that use magnetic/optical media signal processing systems are required to perform recording/readback operations including: converting data to be recorded into a signal and recording the signal to a medium; and decoding signal information read from a recording medium into data with a high degree of reliability. In particular, with recording media on which information is stored at high recording densities, the readback signals show significantly degraded signal quality. This results from factors such as low signal levels due to smaller storage units, deformations in waveforms due to intersymbol interference, disturbances due to electrical noise or physical defects on media and problems between the media and the readback transducer (head).

To overcome this type of readback signal degradation, and in particular to improve reliability in the decoding of recorded data with regard to increased intersymbol interference and noise, there has recently been active use of high-level data transfer communication technologies such as the PRML (Partial-Response Maximum-Likelihood) method, which is based on digital signal processing technology. Recording/readback signal processing technologies that make use of these techniques are implemented in integrated circuits and the like and are used widely in magnetic disk devices and the like. Much of this technology comes from data decoding technology based on maximum-likelihood sequence estimation, which is implemented using the Viterbi algorithm, and a readback waveform equalization technology based on partial-response technology. The former provides tolerance for increased intersymbol interference in the readback signal while the latter reduces random decoding errors that accompany the decoding of data with high levels of noise. These work to compensate for decreased reliability in the decoded data.

Also, conventional technologies generally use error correction coding technologies. The reliability of decoded data is improved by performing detection and correction of errors during readback for decoding errors generated after decoding data using the maximum-likelihood technique described above. An example of this error correction coding (ECC) technology is the combination error correction coding technology that uses the interleaving technique and Reed-Solomon coding. This is used in many information storage devices, including magnetic disk devices and optical disk devices. Thus, it is possible to detect and correct errors in the decoded data generated from the various factors described above including random decoding errors caused during data decoding by noise. This allows a high degree of reliability to be maintained in the decoding and readback of data stored in high-density storage/readback devices. Implementations of this type of error correction coding technology can be found, for example, in R. D. Cydecyan, "A PRML system for Digital Magnetic Recording" (IEEE Journal on Selected Areas in Communications, Vol.10, No.1, 1992) as well as in Japanese Laid-open Patent Publication number 11-168514 (U.S. application Ser. No. 09/124,840). For increasing storage density in information recording/readback devices and improving reliability in data decoding and readback, the main technologies are PRML signal processing, which provides a data decoding technique based on the maximum likelihood sequence estimation referred to above, and error detection/correction coding.

BRIEF DESCRIPTION OF THE DRAWINGS

FIG. 3A is a state transition diagram used for maximum-likelihood sequence estimation.

SUMMARY OF THE INVENTION

Figure 1:
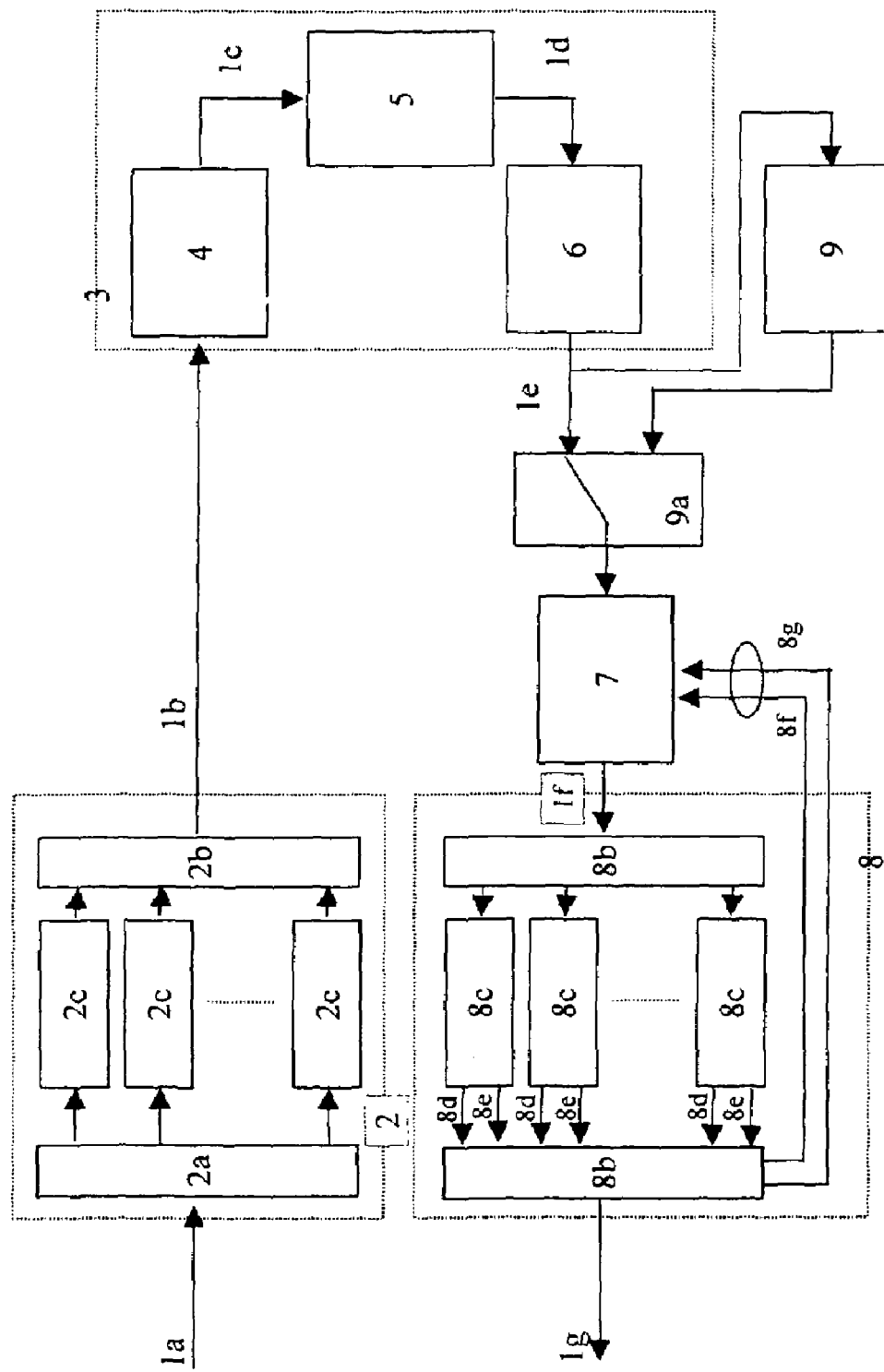
FIG. 1 is a block diagram showing a first embodiment of the present invention.

The object of the present invention is to enhance how error correction coding technology can work together with recording/readback signal processing signals that make active use of PRML signal-processing techniques, particularly maximum-likelihood sequence decoding techniques.

In conventional technologies, data decoding using maximum-likelihood sequence decoding and error correction using error correction coding have been implemented as independent operations. In error correction performed after data decoding, if all decoding errors cannot be corrected the same information is re-read from the recording medium (retry operation) and predetermined signal processing and data decoding operations are performed again. To perform this re-reading of data, many recording/readback devices such as magnetic disk devices must move a readback transducer (head) to a predetermined position where the recorded information is placed, thus significantly increasing the processing time required for data readback. This means that data access performance of the recording/readback device decreases. Thus, providing reliability through this method has its own limits. To restore reliability in the decoding of data and to maintain device reliability for high-density recordings, it is necessary to both improve decoding reliability in maximum-likelihood sequence decoding operations as well as increase effectiveness in error correction.

To achieve these objects, the present invention passes information back and forth between two operations that have conventionally been performed independently: a data decoding operation based on maximum-likelihood sequence decoding and an error correction operation based on error correction coding.

In the present invention correction coding information from the error correction operation described above is used when repeating decoding operations using maximum-likelihood sequence decoding. In conventional technologies, error correction operations and maximum-likelihood sequence decoding are performed independently. Thus, if all decoding errors could not be corrected but a portion of the decoding errors could be checked and corrected, the valid information is discarded. In standard information recording/readback devices. interleaving is used in conjunction with error correction techniques so that information data sequences are divided into a plurality of sequences before error correction is performed. In many cases, it is rare that error correction is impossible for these split-up sequences and decode error data can usually be checked and corrected for one of the sequences. This provides highly reliable results. In the present invention, data results for which error correction was partially successful are fed back to a maximum-likelihood sequence decoder, and maximum-likelihood sequence decoding is repeated only for decode data candidates that match these data results.

Due to the principles behind the decoding performed in maximum-likelihood decoding, burst decoding errors, in which errors are propagated to a plurality of code positions, are often generated. However, if the partial error correction information described is used so that correct code information can be provided for erroneous codes in these burst decoding errors, then all the erroneous codes in the burst error can be corrected and eliminated in a cascading manner. By eliminating burst error propagation in maximum-likelihood sequence decoding, the correction load resulting from long errors can be eliminated from subsequent error correction operations and this significantly improves the effectiveness of the correction operations. As a result, the repeated data decoding and error correction operations serve to mutually reinforce their effectiveness. Thus, by repeatedly performing decoding operations on the same readback signal stored in the recording/readback system, the reliability of the decoded data can be improved without requiring the recorded information to be re-read from the medium.

The signal processing method proposed by the present invention includes: a first step decoding an encoded information data series and generating a decoded data series: a second step detecting decoded data in the decoded data series that is not present in the information data (i.e., errors); and a third step using information relating to the detected decoded data (information regarding errors) to re-decode the information data series and generate a decoded data series.

The encoded information-data series can be, for example, a signal sequence read from a magnetic or an optical information recording medium. For the decoding operation, it would be desirable to use a maximum-likelihood sequence estimation technique based on the Viterbi algorithm. The information relating to errors is at least one, and desirably both, of (1) the position of the error in the decoded data series and (2) the contents of the error data. Alternatively, the information relating to errors can be one, and desirably both, of (1) the position of correct decoded data (i.e., data not containing errors) in the decoded data series and (2) the contents of the correct decoded data.

In the second step, it would be desirable to use an error correction coding technology based on a combination of interleaving and Reed-Solomon coding, as used in magnetic disk devices, optical disk devices, and the like.

Error correction coding technology includes the checking and correcting of decoded data that cannot be present in information data (errors). However, correction is not possible if there are too many errors. It would be desirable to have the third step performed if it is impossible at the second step to correct all the errors.

If interleaving is used, a decoded data series divided into a plurality of code series is generated at the first step, and error checking and correction would be performed separately on each of the plurality of code series at the second step.

In a typical example of the present invention, maximum-likelihood sequence decoding is performed to determine a single decoded data series that appears most reliable out of a plurality of candidate decoded data series (data transitions) (first step). Next, error checking a correction is performed on this decoded data series (second step). If an error that cannot corrected is found, the position/content of the error is fed back to the maximum-likelihood sequence decoding operation. In the maximum-likelihood sequence decoding operation, the decoded data series containing the error is eliminated from the candidate decoded data series and a decoding operation is performed again. Also, decoding is performed again using candidate decoded data series consisting only of decoded data series that do not contain errors (correct decoded data series) (third step). If errors can be corrected by the error correction provided by the second step, the corrected data can serve as the correct data.

The basic architecture of a signal processing device implementing the readback method described above includes: a decoding circuit decoding an information data series and generating a decoded data series; a data detecting circuit detecting decoding error data from the decoded data series and outputting error information regarding the decoding error data; and a feedback signal path sending the error information from the error data detecting circuit to the decoding circuit as input. The decoding circuit uses the error information to perform a re-process the same position in the information data series that has already been processed. It would be desirable to have this type of signal processing device provided in the form of a single-chip semiconductor integrated circuit (LSI). By using this type of LSI in a circuit for a magnetic or optical information recording device, an information recording device that can accurately decode signals recorded on an information recording medium can be provided. The LSI can also contain a recording circuit for recording signals to the recording medium, a control circuit for providing overall control over the information recording device, or the like, thus providing a single-chip disk controller. This type of architecture allows compact implementation of recording/readback devices as well as providing higher recording densities in recording/readback devices.

DETAILED DESCRIPTION OF THE PREFERRED EMBODIMENTS

The present invention is suited for use in data recording/readback devices that use data storage media such as magnetic or optical media. The object is to provide means for performing decoding/readback with a high degree of reliability so that a low-quality readback signal sequence obtained using a readback head (transducer) from an information recording medium storing information at a high density can be converted into recorded information code sequences (recorded readback information).

FIG. 1 shows a schematic block diagram of an information recording/readback device in which the present invention is implemented. In standard information recording/readback systems, recorded information is converted to a recorded information code sequence 1a based on a predetermined encoding method, and this is sent to the information recording/readback system. When reading back the recorded information code sequence 1a from a high-density information recording medium, decoding errors that accompany quality degradation of the readback signal take place due to external factors such as reduction in readback signal output or various types of noise or due to defects on the medium. In order to achieve the desired degree of reliability in decoding, a predetermined error detection/correction coding is performed on the recorded information code sequence 1a in order to detect and correct decoding errors generated during decoding readback (readback data codes that do not match the original recorded information code sequence), and redundant check digits are added for error checking.

In many information recording/readback systems such as magnetic disk devices and optical disk devices, Reed-Solomon encoding or the like is used in combination with interleaving to provide error detection/correction features for various types of decoding errors including intermittent decoding errors. To provide efficient detection and correction of random decoding errors in high-noise environments, simple algebraic coding such as parity-check coding or Hamming coding is often used as well. An error checking/correcting encoder 2 performs this predetermined error checking/correction coding on the recorded information code sequence 1a and outputs a recorded information code sequence 1b, which is sent to a recording/readback system channel 3.

The recording/readback system channel 3 records the record information code sequence 1b to a predetermined position on the information recording medium using a predetermined method and also reads this recorded information as the readback signal sequence 1a when needed.

The recording signal processing system 4 converts the recording information code sequence 1b to the recording signal sequence 1c, performs predetermined signal processing such as amplification of signal levels, and sends the resulting signal to a recording head, an optical head, or the like. A recording/readback head/recording information media system 5 contains a sequence of head/media systems, including a mechanism for reading the stored information as a readback signal sequence 1d. A readback signal processing system 6 includes an amp for amplifying the readback signal sequence 1d to a predetermined level while removing variations in the signal, means for filtering for removing noise in the readback signal sequence 1d, means for shaping readback signal waveforms, means for equalizing, means for performing discrete sampling of the readback signal sequence 1d at a predetermined timing to convert the signal to a digital signal sequence, and the like. The recording/readback system channel 3 described above is provided through known technologies. In the present invention, various types of recording/readback system channels 3 can be used such as those used for magnetic recording information media and optical recording information media.

In high-density information recording/readback systems, the recording/readback conditions result in significant deterioration in the signal bandwidth of the readback signal sequence 1d, leading to high intersymbol interference. To overcome this, partial-response transfer functions are often added, and a narrow-band transmission system that tolerates intersymbol interference is applied to the readback signal sequence 1e. In magnetic recording/readback systems, a transfer function polynomial of $(1-D)(1+D)n$ (where n is a natural number representing the order and D is an operator indicating the delay for a single code time). For example, if n=2 and a transfer function extended class-IV partial response is to be used, an input of a binary code sequence $a(k)=\{+1,-1\}$ (where k is a natural number representing the code time) results, for the corresponding code time, in an output from the recording/readback signal channel 3 indicated by signal values y(k) for the readback signal sequence 1e when there is no noise, where:

$$y(k)=(1-D)(1+D)^{n*}a(k)=a(k)+a(k-1)-a(k-2)-a(k-3) \qquad (1)$$

This type of partial-response transfer function is achieved by adjusting the intersymbol interference in the readback signal sequence 1e so that the desired transfer function indicated in equation (1) is provided for the entire recording/readback channel 3. This is done by performing filtering and readback waveform equalization operations in the readback signal processing system 6 based on desired recording/readback conditions and the recording reaback head/recording information media system 5.

This type of recording/readback system channel 4 having a partial-response transfer function can be represented as a simple linear model containing memory elements.

Figure 2:
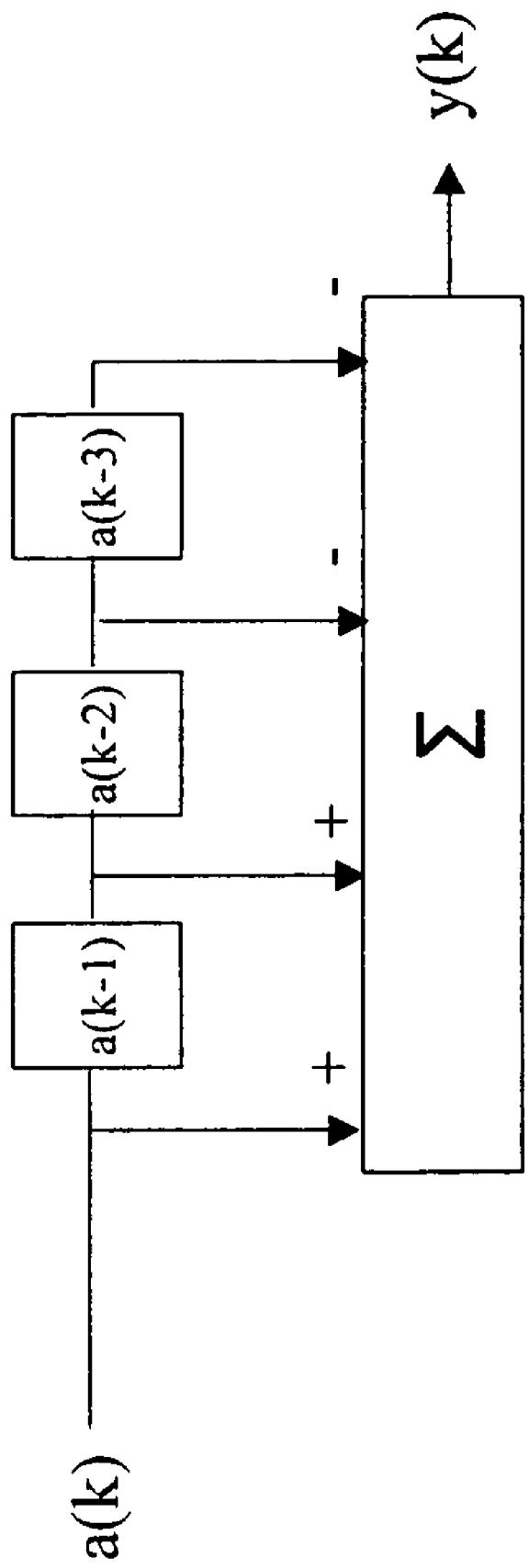
FIG. 2 is a schematic drawing showing extended class-IV partial response transmission channel characteristics.

FIG. 2 is a schematic drawing indicating the characteristics of an extended class-IV partial response transfer channel. For an extended class-IV partial-response transfer function based on equation (1), the recording/readback system channel 3 can be structured as shown in FIG. 2 using three memory elements. In the readback signal sequence 1e, a signal value y(k) at a code time k is determined by the input code value a(k) of the recording information code sequence 1b for the current time and the input code states {a(k−1),a(k−2),a(k−3)} from three past times. Since the states of the memory elements in the partial-response transfer system are to be estimated, maximum-likelihood sequence decoding is used. This type of method for estimating memory elements in the recording/readback system channel 3 (maximum-likelihood sequence estimation) is a known technology that significantly improves reliability in decoding the readback signal sequence 1d in the presence of superposed noise.

In place of using the partial-response transfer function described above, it would also be possible to add this type of memory element to the characteristics of the recording/readback system channel 3 by providing predetermined coding such as convolutional coding or preceding into the input and intentionally adding memory elements to the recording information code sequence 1b and the readback signal sequence 1d.

A maximum-likelihood sequence decoder 7 performs decoding and readback of the readback code sequence 1f while performing code estimation of the memory elements as described above on the readback signal sequence 1e from the recording/readback system channel 3. Decoding algorithms such as the Viterbi algorithm are widely used for this. In the decoding performed by the maximum-likelihood sequence decoder 7, the incoming readback signal sequence 1d is processed to output a readback code sequence 1f consisting of a code sequence having the smallest probability of containing decoding errors is selected from all possible maximum-likelihood candidate code sequences, taking into consideration the code states (code constraint conditions) described above for the entire signal sequence. As a result, the probability of decoding errors in the readback code sequence $1f$ is minimized. However, as described later, a decoding error will result in a code sequence error, which will lead to bursts of decoding errors or propagation of decoding errors involving code containing a plurality of decoding errors.

In order to detect and correct codes with decoding errors in the readback code sequence $1f$ generated by the maximum-likelihood sequence decoder 7, the readback code sequence $1f$ is sent to an error data detector/corrector 8. The error data detector/corrector 8 performs error checking based on the error checking/correcting encoding performed by the error data detection/correction coder 2. More specifically, readback code sequences not consistent with the rules for the original recorded signal code arrangement are detected as decoding errors. Then, detected decoding errors are corrected to their proper codes and this is then output as the readback code sequence $1g$ (recording/readback information).

Error checking/correction coding using interleaving techniques is a known technology for providing a simple method for correcting various decoding errors such as bursts of decoding errors.

In the embodiment shown in FIG. 1, structures implementing interleaving are provided in the error data detection/correction encoder 2 and the error data detector/corrector 8. A plurality of independent encoders $2c$ are disposed in the error data detection/correction encoder 2, and the received record information code sequence $1a$ is divided by an interleaver $2a$ into code blocks that are sent to the different coders $2c$. A de-interleaver $2b$ takes the split-up record information code sequence $1a$ and recombines them in their original order, adds checking redundancy code generated by the encoders $2c$, and sends out the result as the record information code sequence $1b$.

Similarly, the error data detection/correction encoder 8 contains a plurality of independent decoders $8c$ corresponding to the encoders $2c$. The code sequence is split up in the same manner as in the error data detection/correction encoders 2, and a predetermined error correction method is applied. The interleaver $8a$ splits up code sequences in a manner corresponding to the interleaver $2c$, distributes code blocks from the incoming readback code sequence $1f$ to individual decoders $8c$, and performs the predetermined error checking and correcting operations independently on each code sequence. Also, each of the decoders $8c$ outputs a flag $8e$ indicating whether all decoding errors in the corresponding code sequence have been corrected or not. When all the flags $8e$ indicate that no decoding errors were found in the code sequences or that detected decoding errors have been corrected, then the code sequences $8d$ which have gone through error checking and correction are reconstructed in the original code block sequence of the record information by the deinterleaver $8b$. The result is output as a readback code sequence $1g$.

In conventional information recording/readback systems, if many decode errors take place and the resulting decode errors exceed the error checking and correction capability of the error data detection/correction encoder 2 and the error correction capability of the error data detector/corrector 8, the error data detector/corrector 9 sends an output indicating that the decoding errors cannot be corrected. Then a decode/readback operation is performed again for the same information code sequence (a retry operation) based on a read operation of a readback signal sequence $1d$ using the recording/readback head record information media system 5. In general, this re-reading operation is performed to attempt to improve decoding errors when one of the interleaved code sequences is determined to be uncorrectable so that one of the flags $8e$ from FIG. 1 indicates that all detected decode errors were not corrected.

However, in the present invention the readback signal sequence $1e$ output from the recording/readback system channel 3 is stored in a storage circuit formed beforehand using semiconductors or the like. The readback signal sequence $1e$ is stored using a predetermined readback unit (often, in data sectors for magnetic or optical disk devices and in blocks for tape devices). Then, if the error data checker/corrector 8 finds code with a decode error in the readback code sequence $1f$ and determines that the detected decoding error cannot be corrected, i.e., if one of the flags $8e$ in the error data checker/corrector 8 indicates that all detected decoding errors were not corrected in the corresponding interleaved code series, then a selector circuit $9a$ selects signal information stored in the storage circuit 9 and sends this as input to the maximum-likelihood sequence decoder 7, where the same operations are repeated. In other words, the maximum-likelihood sequence decoder 7 repeats its operations on the same readback signal sequence $1e$. During this repeated decode operation performed by the maximum-likelihood sequence decoder 7, the partial code information from the readback code sequence $1g$ detected by the error data checker/corrector 8 is fed back as input so that it is used for the re-decoding operation.

If the error data checker/corrector 8 determines that a decoding error cannot be corrected, the probability will be extremely small that all of the flags $8e$ will indicate that error correction will be impossible for the plurality of interleaved code sequences used for checking and correcting decoding errors. Thus, the deinterleaver $8b$ will refer to the flags $8e$ and selectively output interleaved code sequences for which detected decoding errors have been corrected or code information from interleaved code sequences for which no errors were detected (the code position information $8f$ and the code information $8g$). This will be fed back as input to the maximum-likelihood sequence decoder 7. Thus, the partial code information that is fed back is formed either from code information at code positions (the code position information $8f$ and the code information $8g$) determined by the error data checker/corrector 8 to contain no decoding errors (correct data codes) or from code information at code positions (the code position $8f$ and the corrected code information $8g$) for which decoding errors have been checked and corrected.

FIG. 3A shows a state transition diagram used for performing maximum-likelihood sequence estimation on the recording/readback channel 3 having an extended class-IV partial-response transfer function based on equation (1) described above. In the extended partial-response transfer function, eight transition states $10a$–$10h$ can be defined for binary information code, taking into account the code states $\{a(k-1), a(k-2), a(k-3)\}$ (past code states) in the three memory elements described above. For each of the transition states $10a$–$10h$, arrows represent branch paths 11 indicating transitions to the code step for the next time, corresponding to the binary information code $a(k)$ sent to the recording/readback channel 3 at each code time $k$. Two branch paths point to each transition state at each time.

A branch path going from a transition state I to a transition state j at a code time k is represented as $b_k(i,j)$. Using the code states and {a(k−1),a(k−2),a(k−3)} for the transition state i, which serves as the base point, as well as the code value a(k) assumed for that code time, equation (1) determines an ideal signal value $d_k(i,j)$ that appears as the output, with no noise, from the recording/readback channel 3 for the branch path. In the Viterbi algorithm, which is a widely known technology, the signal value u(k) of the readback signal sequence 1d sent to the maximum-likelihood sequence decoder 7 at code time k is referenced and the mean-square error (path metric) in relation to the ideal signal value $d_k(i,j)$ described above is evaluated. Based on this, for each transition state $S_k(i)$ at each time value, the branch path with the smaller accumulated mean-square error (path metric) is selected from the two branch paths that lead to the transition state.

Figure 3B:
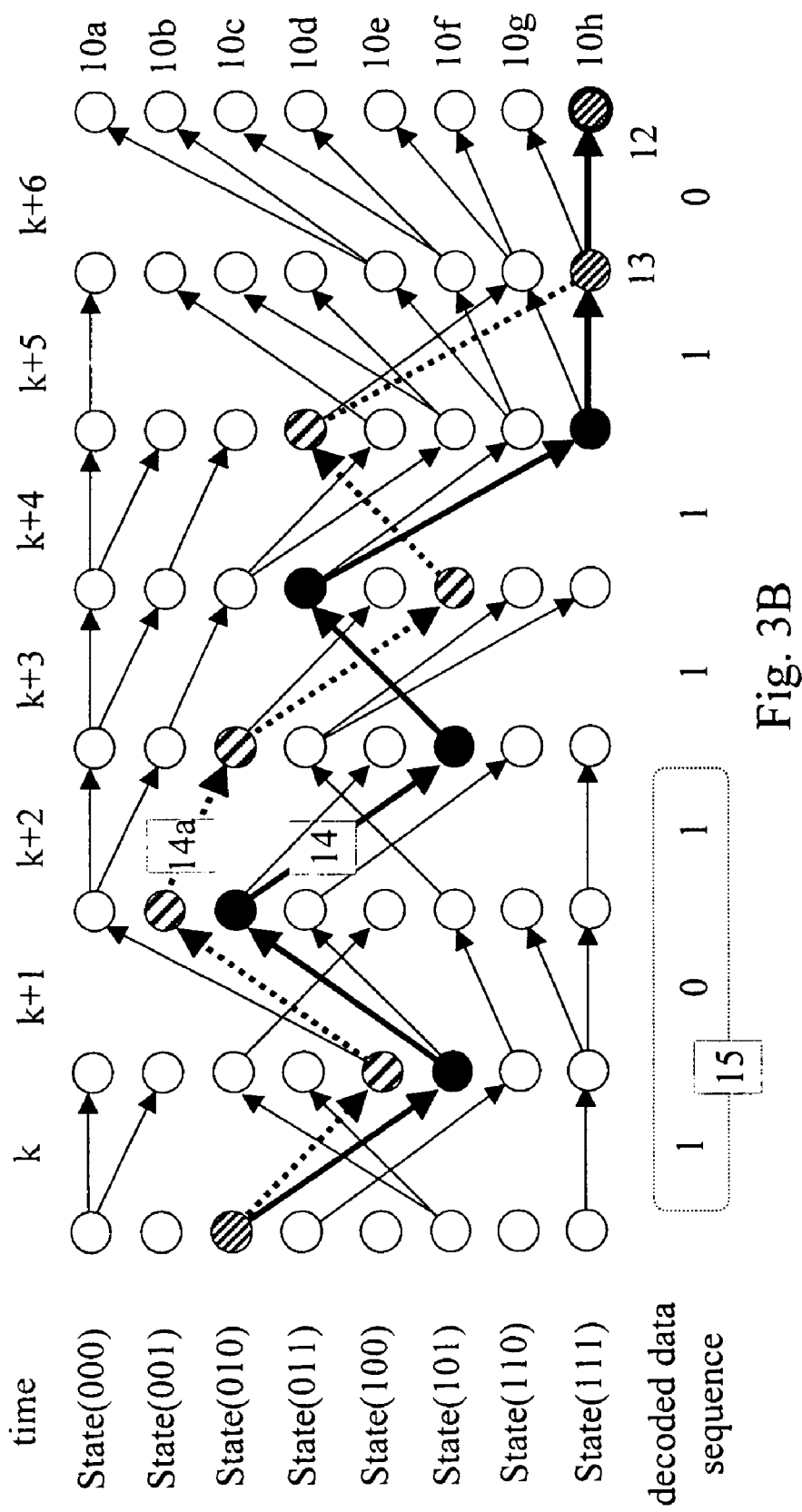
FIG. 3B is a state transition diagram showing an example where a maximum-likelihood sequence has been determined.

FIG. 3B shows an example where selection of branch paths to transition states is repeated until a final maximum-likelihood path sequence 12 (indicated by a thick line) is determined. In the maximum-likelihood path sequence 12 established in this example, an error in selecting branch paths leading to the transition state 13 leads to the correct code sequence 14a being replaced with the erroneous code sequence 14, resulting in a decoding error. As a result, at the three code times k–k+2, consecutive decoding errors 15 (error propagation) take place. Thus, in maximum-likelihood sequence decoding that uses conventional technology such as the Viterbi algorithm, selection errors in the maximum-likelihood candidate code sequence (the maximum-likelihood path) can often lead to readback code sequences in which there is error propagation due to a plurality of consecutive encoding errors.

In the present invention, this type of error propagation is eliminated by feeding back code information to the maximum-likelihood sequence decoder 7 during retry operations for maximum-likelihood sequence decoding. In the error data checker/corrector 8 shown in FIG. 1, consecutive erroneous codes generated by error propagation in the readback code sequence 1f are split up through interleaving into a plurality of code sequences to which error correction coding is applied. The plurality of decoders 8c independently corrects the erroneous codes, so that there is a high probability that portions of the split-up erroneous codes are corrected. The information about the partially erroneous code on which correction has been performed (code position information and corrected code) is used to eliminate error propagation in maximum-likelihood decoding retry operations.

Figure 3C:
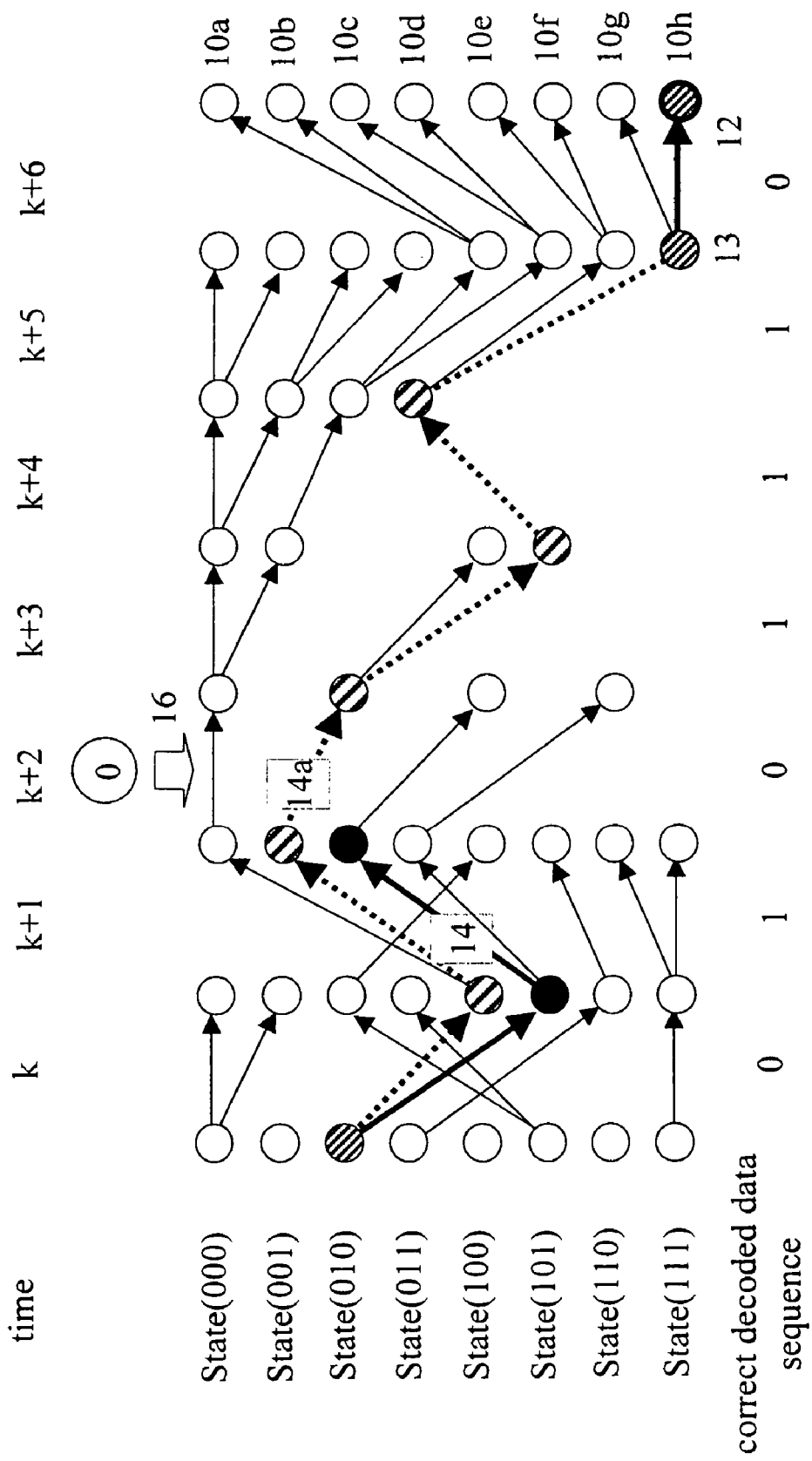
FIG. 3C is a state transition diagram showing maximum-likelihood estimation in a loop operation in the present invention.

FIG. 3C shows an example where the consecutive decode error codes (error propagation) 15 from FIG. 3B can be eliminated. In the retry operation performed by the maximum-likelihood sequence decoder 7, the code position information 8f and the code information 8g are fed back as input. When the corrected code value (proper code value) 16 for code time (position) k+2 in the consecutive decode error code (error propagation) 15, the transition states (code states) starting with the time k+2 that do not match this code 16 and the transition state branch paths can be partially removed from the state transition diagram. By performing maximum-likelihood sequence estimation on this transition state diagram, the same readback signal sequence 1e can be used, the error code sequence 14 generated from FIG. 3B can be removed, the decode error codes (error propagation) 15 generated consecutively at the three code times k–k+2 can be removed, and the correct path indicated by the dotted line can be determined.

In the present invention, highly reliable error correction code information that is fed back is used to retry a maximum-likelihood sequence estimation on a state transition diagram from which some transition states have been removed. This provides a significant reduction in decoding error propagation.

It is very easy to implement a maximum-likelihood sequence decoder 7 that receives the code position information 8f and the code information 8g as feedback and uses a transition state diagram that reflects the corresponding code constraints. In the path branch selection circuit of the maximum-likelihood sequence decoder 7, path branch selection for the code time indicated by the code position information 8f and path branch selection for paths that do not match the corresponding code value information 8g are inhibited. Alternatively, the values (maximum-likelihood values) of the path branch metrics leading to transition states that do not match the corresponding code value information 8g can be replaced with a maximum value (least likely), thus allowing easy implementation without the need to provide special means for performing operations.

Figure 9:
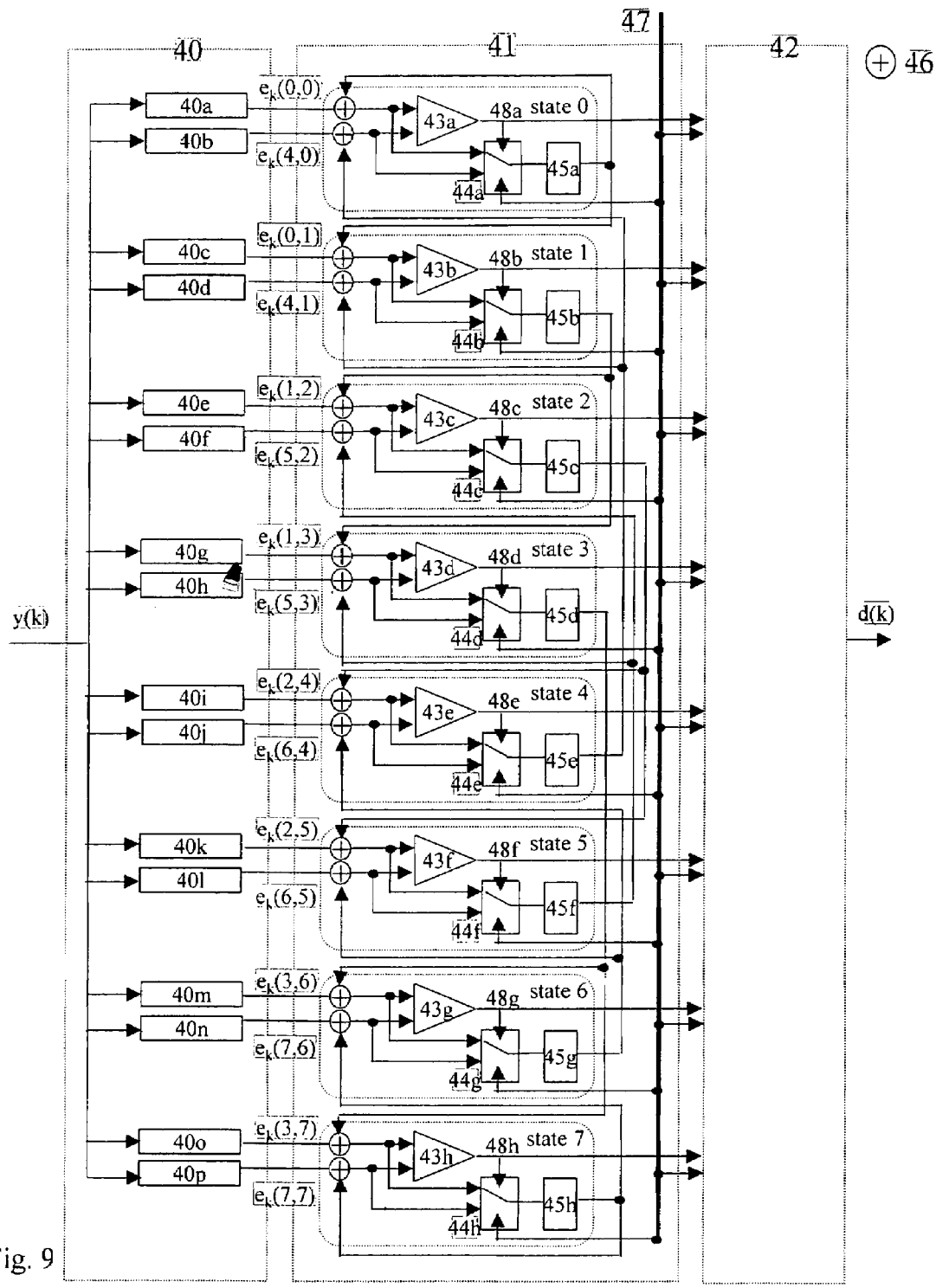
FIG. 9 is a drawing showing the structure of a maximum-likelihood sequence decoder using the Viterbi algorithm according to the present invention.

FIG. 9 is a sample circuit structure according to the present invention or a maximum-likelihood sequence decoder that uses the Viterbi algorithm. The structure shown in this figure performs the maximum-likelihood sequence estimation on the state transition diagram shown in FIG. 3A. A decoder includes: a branch metric calculation unit 40 receiving the readback signal y(k) as input and calculating a mean-square error (branch metric) with reference to an ideal signal value; a path selection unit 41 selecting a path candidate leading to each transition state I; and a selected path memory unit 42 storing path candidates leading to each transition state I. In the branch metric calculation unit 40, for each readback signal value y(k) for time k that is received, mean square error calculation units 40a–40p calculate the mean-square errors $e_k(i,j)=\{y(k)-d_k(i,j)\}^2$ with relation to the ideal signal values $d_k(i,j)$ determined for each state transition path branch. In the path selection circuit 41, comparator circuits 43a–43h and selector circuits 44a–44h, which are disposed to correspond to the state transitions 10a–10h shown in the state transition diagram in FIG. 3A, make selections between the two branch paths (surviving paths) leading into each transition state I based on a comparison of accumulated branch metric values. For example, the combination of the comparator circuit 43a and the selector circuit 44a correspond to the transition state 10a and this combination makes a selection between the two path candidates from the transition states 10a and 10e leading in from the prior time k−1. The cumulative branch metrics received as input by the comparator circuits 43a–43h are generated by the addition, via an adder 46, of the mean square error $e_k(i,j)$ calculated for the path branch corresponding to the new time k to the contents of the metric registers 45a–45h, which store the cumulative branch metrics through the previous time k−1 for the transition paths to the transition states 10a–10h. For example, the two cumulative path metric values from the states 10a and 10e from the previous time leading into the transition state 10a are determined by adding the mean square errors $e_k(0,0)$ $e_k(4,0)$ to the contents of the metric registers 45a and 45e and are sent to the comparator 43a. Based on the evaluations performed by the comparators 43a–43h, the selectors 43a–43h [?44a–44h?] select the smaller of the two branch metric cumulative values received by the corresponding comparators 43a–43h, and the results of these selections are stored in the selection path memory unit 42 as the branch paths (surviving paths) leading to the transition states corresponding to the particular selector at time k. The branch metric cumulative values are for the selected branch paths are also newly stored in the metric registers 45a–45h. In the present invention, maximum-likelihood sequence estimation that takes into account code constraint conditions based on the code position information 8f and the code information 8g received as feedback is performed by sending an inhibit signal 47 to the selectors 44a–44h in response to the code information 8g at the time corresponding to the code position information 8f. In other words, the input signal indicated by the inhibit signal 47 (the branch metric value of the path branch matching the code information 8g) is selected regardless of the comparison results from the comparators 43a–43h. Alternatively, the branch metric values that do not match the code information 8g can be replaced with a maximum value and sent to the comparators 43a–43h so that the comparators are inhibited from selecting the branch metric values of these path branches.

With the structure described above, maximum-likelihood sequence decoding can be performed without requiring maximum-likelihood sequence decoders 7 that use different structures.

In FIG. 4, the process for correcting decoding errors for retry operations performed by the maximum-likelihood sequence decoder 7 and the error data checker/corrector 8 is shown. In this embodiment, the recorded information code sequence is interleaved into four code sequences 21a–21d using code blocks 20 (indicated by squares in the figures) as units. Reed-Solomon error correction coding is applied to each code and error checking code blocks 22a–22d are added to each code sequence. The Reed-Solomon error checking encoding provides error correction on code blocks. In the code sequences 21a–21d, it is assumed that up to three code blocks with errors can be corrected.

Figure 4A:
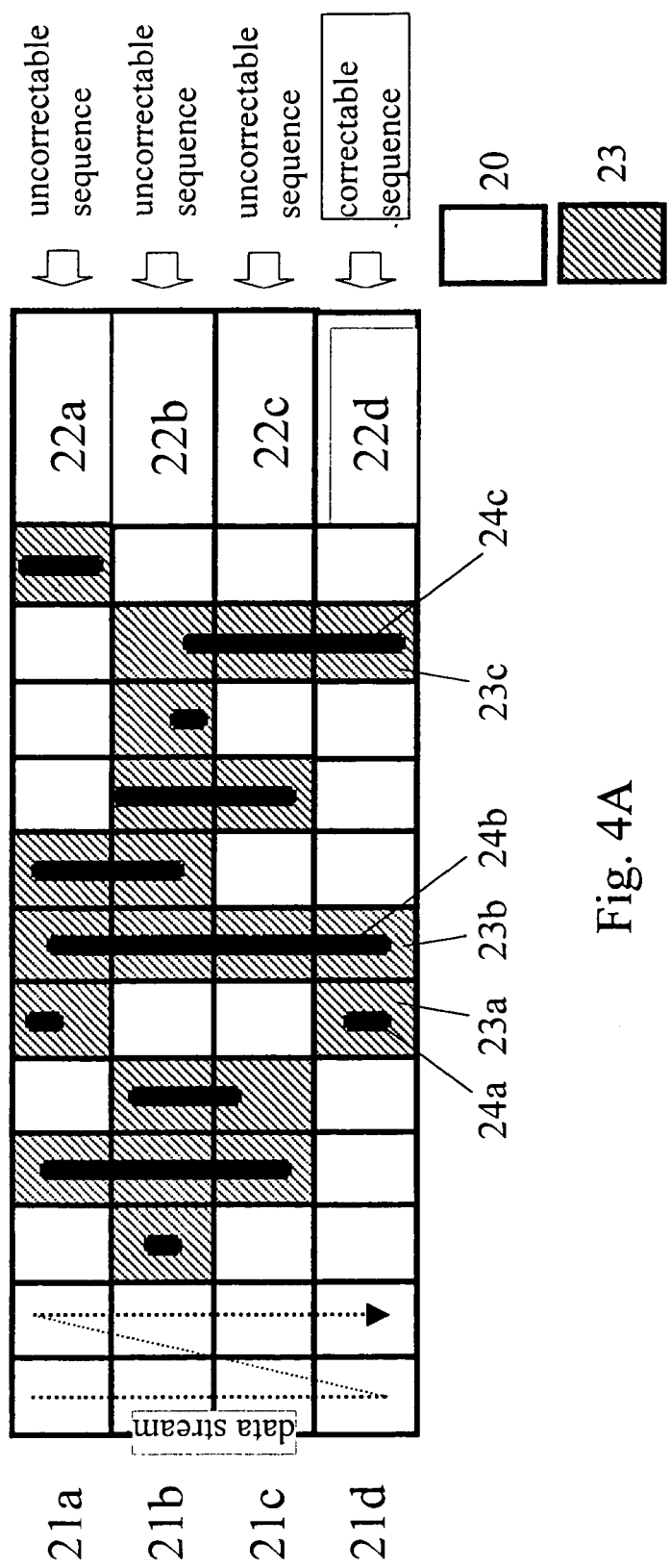
FIG. 4A is a schematic diagram showing a sample decoding state after a (first) maximum-likelihood sequence decoding operation.

FIG. 4A shows the decoded state after the first maximum-likelihood sequence decoding operation. The thick vertical lines indicate the code positions where decoding error propagation occurred in the maximum-likelihood sequence decoder 7. In the figure, the shaded code blocks indicate error code blocks 23. Of the many error code blocks 23, the three error code blocks 23a–23c belonging to the code sequence 21d can be corrected by Reed-Solomon error correction coding. The code position information 8f and the corrected code information 8g for the three corrected error code blocks 23a–23c are fed back to the maximum-likelihood sequence decoder 7. The maximum-likelihood sequence decoding operation is repeated as shown in FIG. 3C and the three decoding error propagation 24a–24c are removed from the decoding results.

Figure 4B:
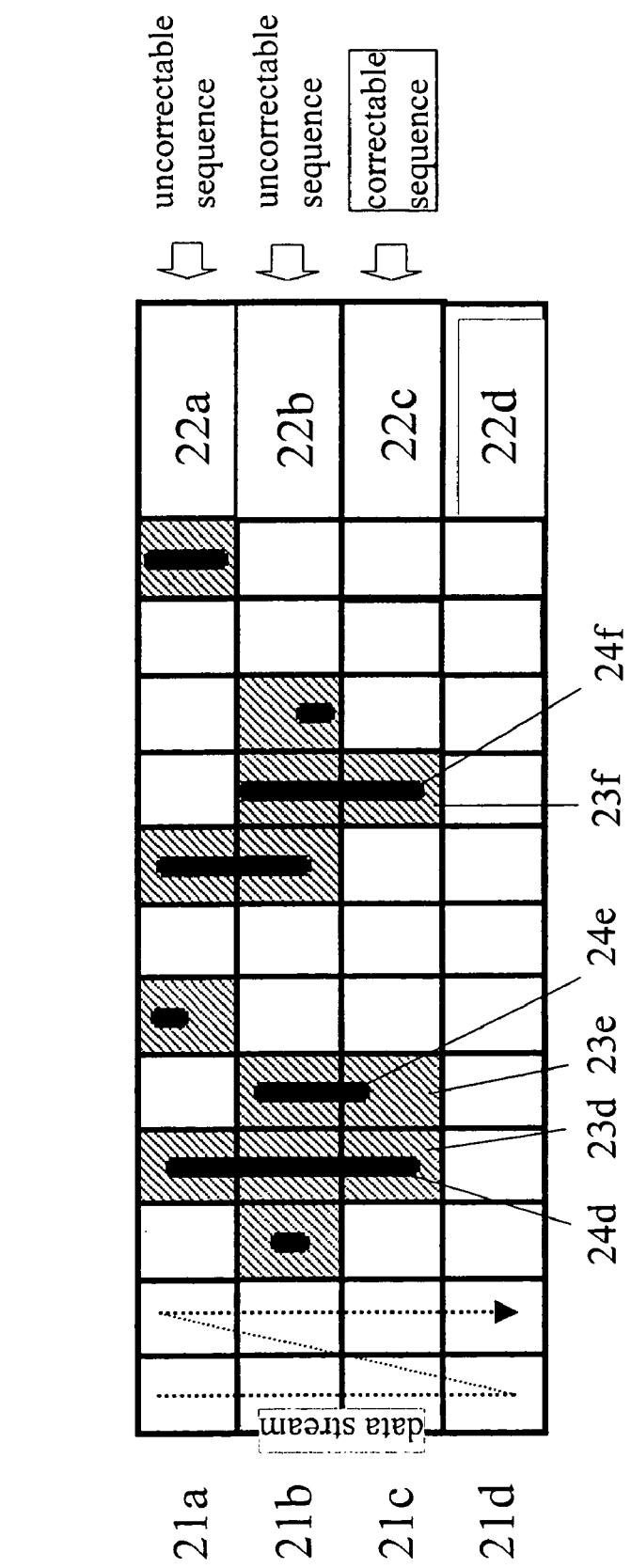
FIG. 4B is a schematic diagram showing a sample decoding state after a (second) maximum-likelihood sequence decoding operation.

FIG. 4B shows the decoding states after the second maximum-likelihood sequence decoding. As a result, the three error code blocks 23d–23f belonging to the code sequence 22c can be corrected in the error data checker/corrector 8.

Figure 4C:
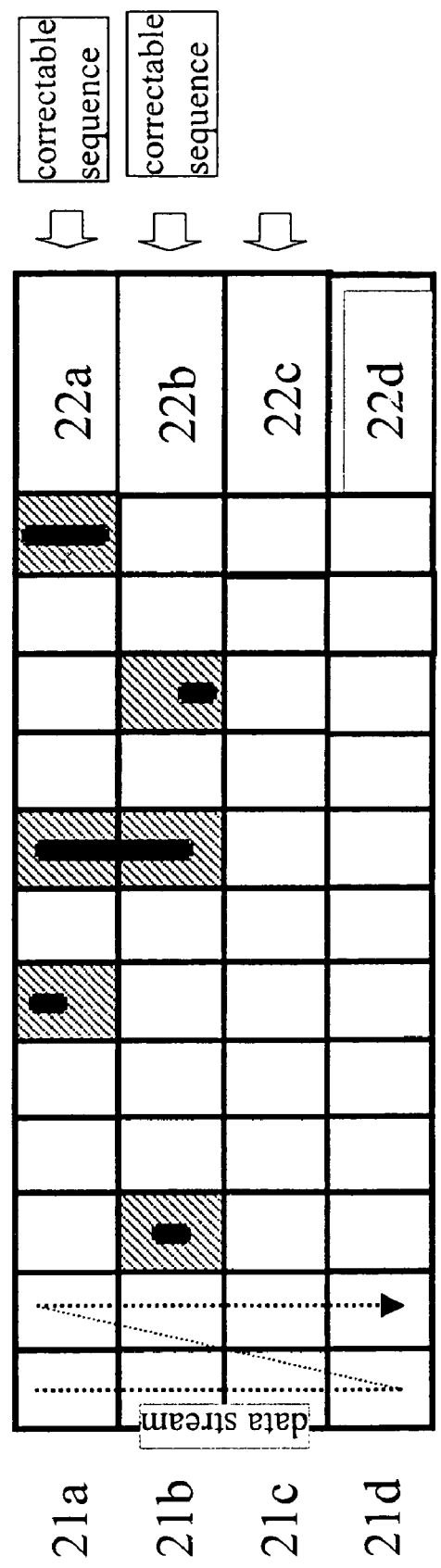
FIG. 4C is a schematic diagram showing a sample decoding state after a (third) maximum-likelihood sequence decoding operation.

FIG. 4C shows the decoding states after the third maximum-likelihood sequence decoding has been performed based on this corrected error coding block information. The three decode error propagation 24d–24f have been eliminated and the final error code blocks belonging to the code sequences 22a, 22b can be corrected. As described above, by using both interleaved Reed-Solomon coding and partial response maximum-likelihood sequence decoding, maximum-likelihood sequence decoding operations and error correction can be performed to correct multiple decode errors in a manner similar to solving a crossword puzzle.

Figure 5:
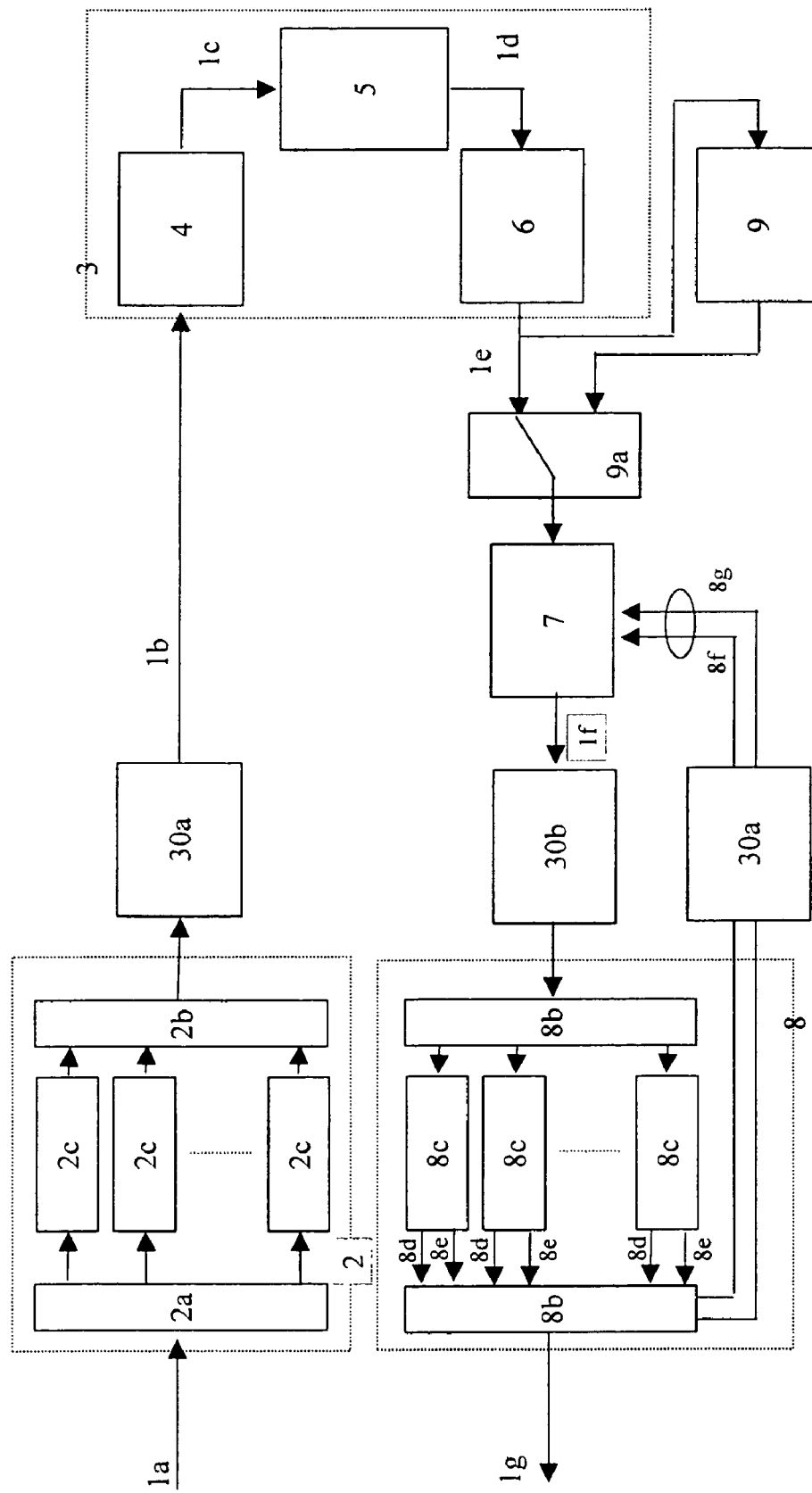
FIG. 5 is a block diagram showing a second embodiment of the present invention.

FIG. 5 shows a second embodiment of the present invention. This embodiment differs from the embodiment shown in FIG. 1 in that a code scrambling circuit 30a for changing the code sequence of the record information code sequence 1b is interposed between the error data detection/correction encoder 2 and the recording/readback-system channel 3. Also, a reverse code scrambling circuit 30b corresponding to the code scrambling circuit 30a and changing the code sequence of an code sequence input in the opposite direction is interposed between the maximum-likelihood sequence decoder 7 and the error data detector/corrector circuit 8. The code a sequence changed by the code scrambling circuit 30a is restored to the original code sequence by the reverse code scrambling circuit 30b. The code position information 8f and the code information 8g takes the ordering of the code sequence at the input and output of the reverse code scrambling circuit 30b into account and performs appropriate conversions via a similar code scrambling circuit 30a so that there are no inconsistencies between the code position information and the corresponding code information. The purpose behind the code scrambling circuits 30a and the reverse code scrambling circuit 30b is to disperse the error codes from decoding error propagation generated in the maximum-likelihood sequence decoder 7 in the plurality of interleaved error code sequences. This allows sections of error codes in decode error propagation to be more easily corrected by the error data detector/corrector 8. By increasing the probability that a section of error code within decoding error propagation can be corrected in the decoder 8c of the error data detector/corrector 8, the probability is increased that when the corrected code information is fed back, the decoding operation performed by the maximum-likelihood sequence decoder 7 will be able to eliminate the decoding error propagation.

Figure 6:
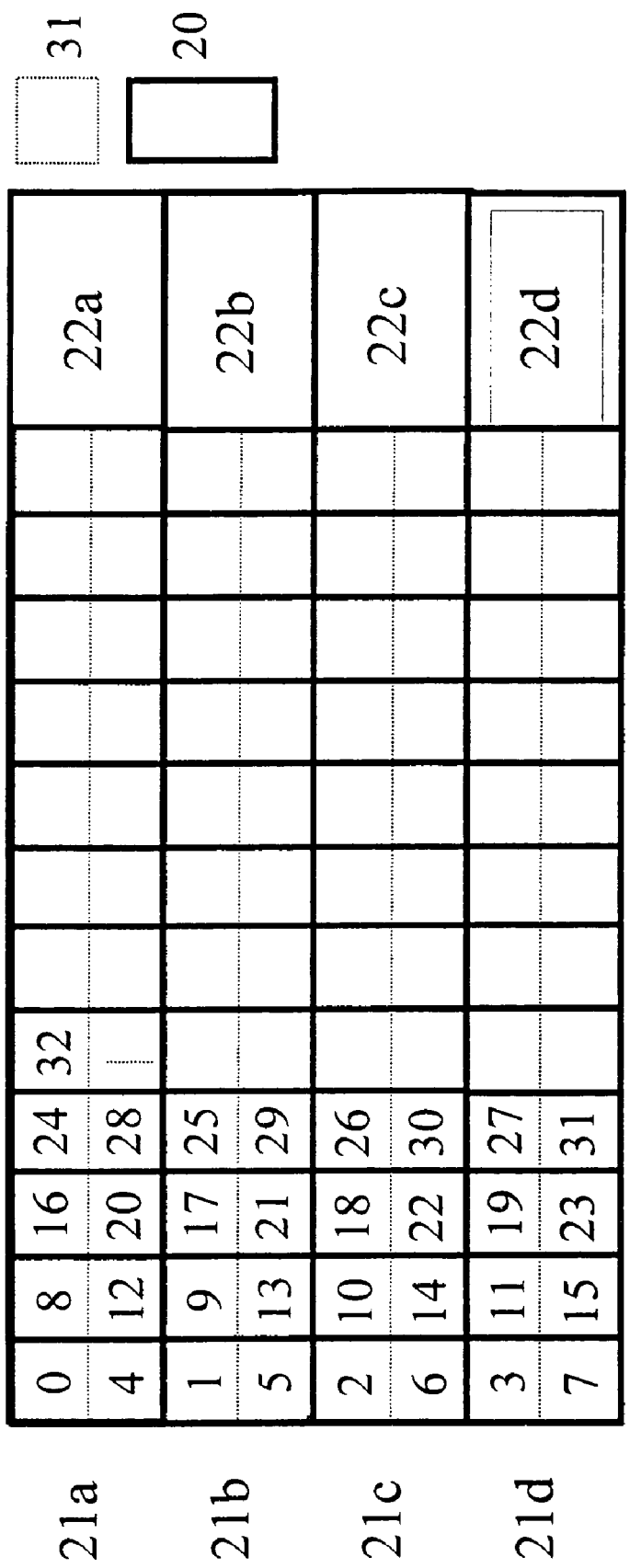
FIG. 6 is a schematic diagram showing a sample operation performed by a scrambling circuit from a second embodiment of the present invention.

FIG. 6 shows an example of the change in code sequence, performed by the code scrambling circuit 30a used in this embodiment as shown in FIG. 5. In this embodiment, the record information code sequence 1a is interleaved as four code sequences 21a–21d using code blocks 20 (shown in the figure as squares with thick lines) as units. Reed-Solomon error correction coding is performed on each of the codes, and error checking code blocks 22a–22d are added to each of the code sequences. The Reed-Solomon error correction coding is performed on each code block 20. In this embodiment, the code blocks 20 are divided into record code blocks 31 having half the code length. The code scrambling circuit 30a uses these blocks as the processing unit and changes the code sequence as indicated by the sequence of numbers added to the blocks in the figure. As the figure shows, the code length of the record code blocks 31 are set to be smaller than the code lengths of the code blocks 20. The code scrambling circuit 30b changes the code sequence so that the record code blocks 31 recorded consecutively on the recording medium are separated by at least a predetermined code length after being output from the code scrambling circuit 30b. As a result, the recording code blocks 31 that are recorded consecutively on the recording medium are positioned at different code sequences 31a–21d in the error data checker/corrector 8. The code blocks 31 have a shorter code length than the code blocks 20 so that decode errors from maximum-likelihood sequence decoding that occur in a single code block 20 tend to be separated into different code sequences 21a–21d. As a result, sections of decoding propagation that have code lengths of at least half that of the code block 20 (i.e., the code length of the record code block 31) will be more easily corrected in one of the independent code sequences 21a–21d. By repeatedly feeding back the error correction information and the performing maximum-likelihood sequence decoding, the probability that the decoding errors will all be eliminated is increased. By providing code scrambling circuits in the maximum-likelihood sequence decoder 7 and the error detector/corrector 8, the effectiveness of correcting decoding errors is increased in the present invention.

Figure 7:
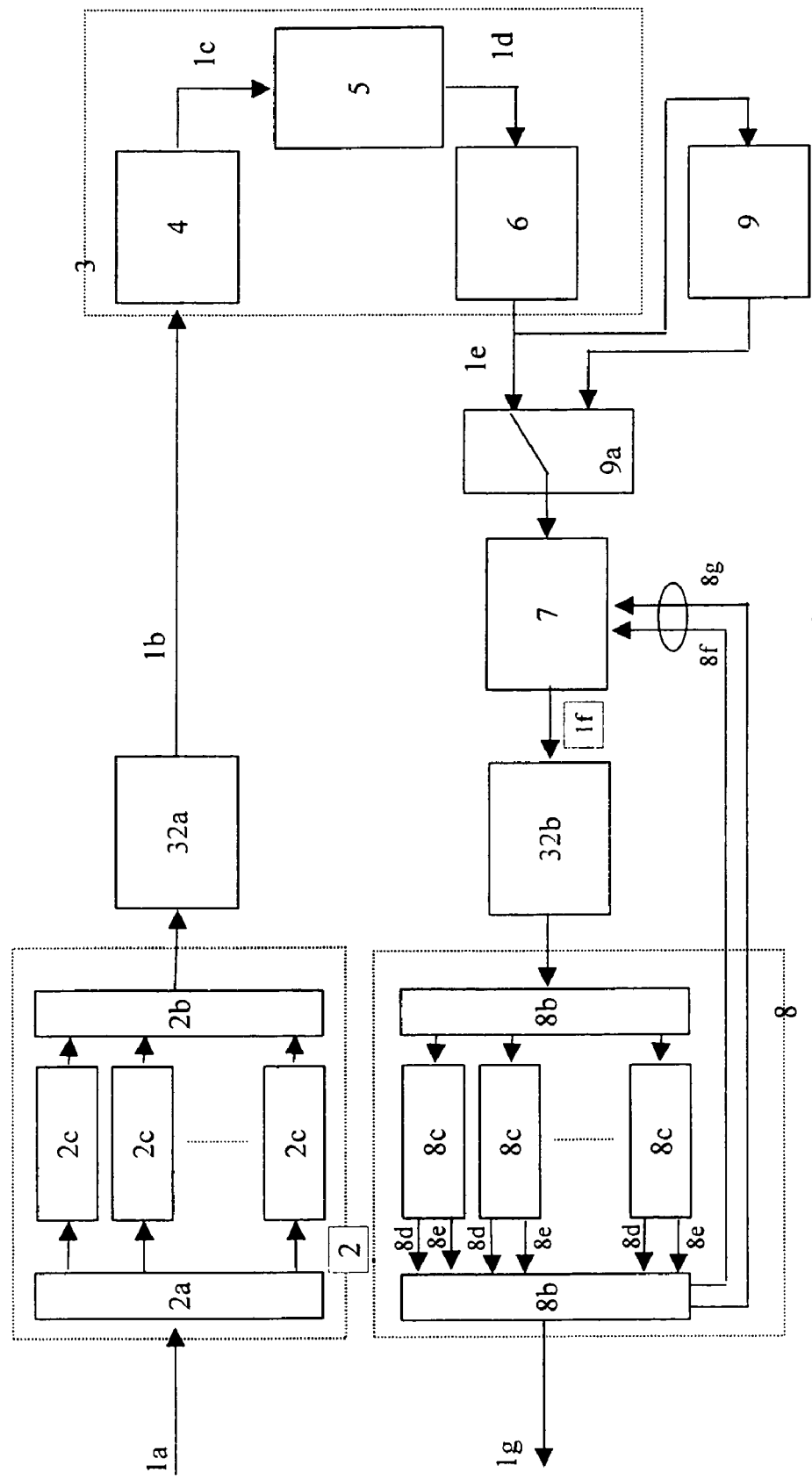
FIG. 7 is a block diagram showing a third embodiment of the present invention.

FIG. 7 shows a third embodiment of the present invention. In this embodiment, a second error data checker/corrector 32b is disposed for the readback code sequence 1g output from the maximum-likelihood sequence decoder 7 and a corresponding second error data detection/correction encoder 32a is disposed for the record information code sequence 1b. In this second error data detection/correction encoder 32a, decoding error propagation with relatively short code lengths are corrected through a relatively simple error correction code such as parity codes or Hamming codes. More specifically, in the embodiment shown in FIG. 5 decoding errors shorter than the code length of the code blocks 20 or the recording code blocks 23 are corrected by the second error data detector/corrector 32b. This allows the present invention to eliminate decode errors generated within individual code sequences 21a–21d which cannot be improved by repeatedly performing maximum-likelihood sequence decoding, thus improving correction efficiency for the error data detector/corrector 8. This makes the decoding error code correction performed by the present invention even more effective.

Figure 8:
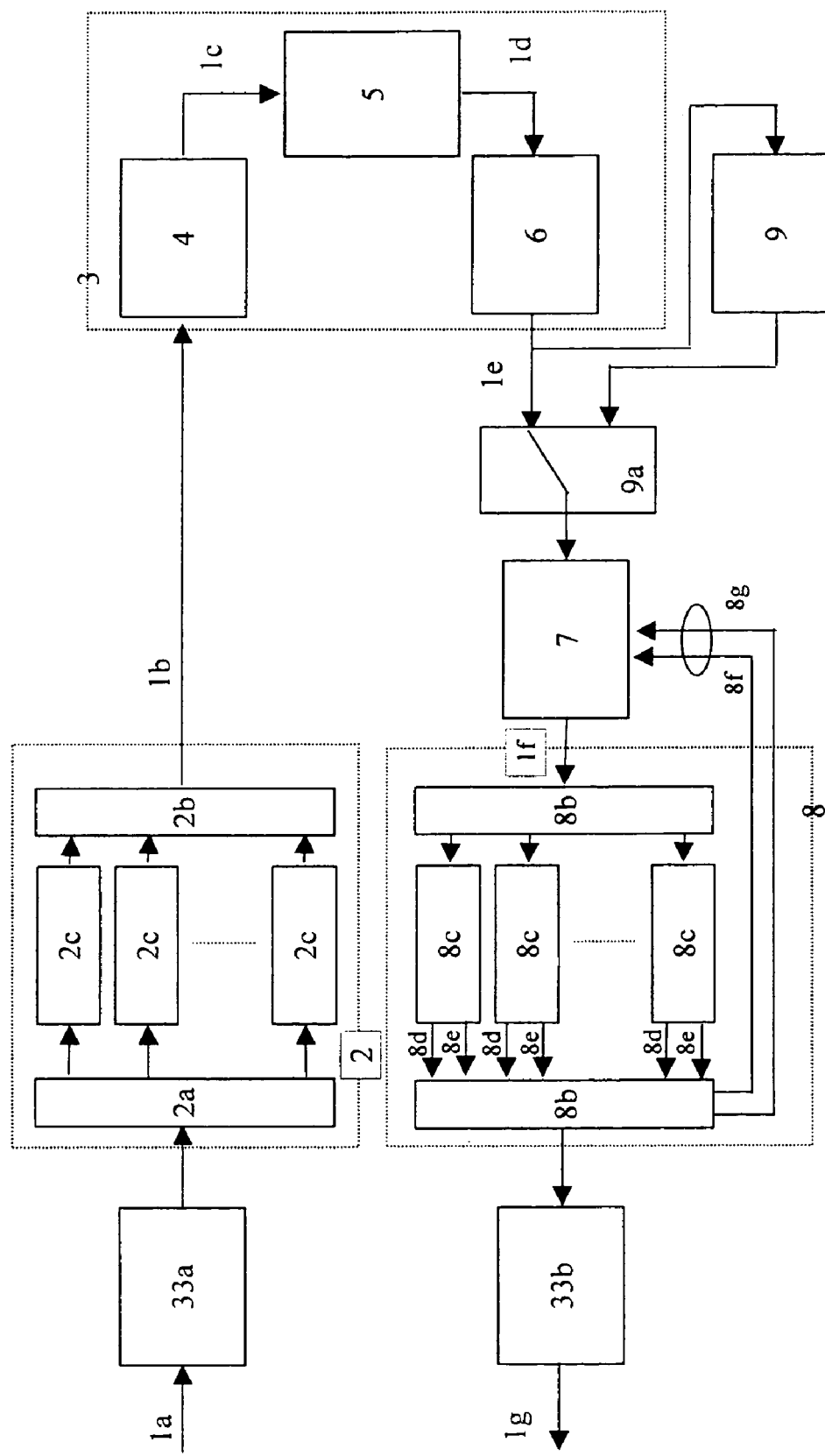
FIG. 8 is a block diagram showing a fourth embodiment of the present invention.

FIG. 8 shows a third embodiment of the present invention. In standard information recording/readback systems, code conversion through modulation coding is applied to the record information code sequence 1b in order to add predetermined code constraint conditions such as run-length restrictions. This is done for various reasons such as to extract timing for the information code from the readback signal sequence or to keep delay time to no more than a fixed value in maximum-likelihood sequence estimation decoding. In this embodiment, a modulator 33a for performing this modulation encoding on the recording information code sequence 1a received as input by the information recording/readback system. A demodulator 33b is disposed for the readback code sequence 1g output from the information recording/readback system. The demodulator 33b performs reverse conversion corresponding to the code conversion performed by the modulator 33a to restore the code sequence to the original information code sequence. In the information recording/readback system according to this embodiment, the positional relationships in the code information is maintained and the output from the maximum-likelihood sequence decoder 7 and the input from the error data checker/corrector 8 are tightly bound to allow the code position information 8f and the code information 8g to be fed back. Thus, the modulator 33b performing code conversion is disposed for the code sequence output from the error data checker/corrector 8, and, in a corresponding manner, the demodulator 33a is disposed for the input code sequence for the error data detection/correction encoder 2. The structure used in this embodiment is the same as the standard structure used for the information recording/readback system of the present invention.

In the information recording/readback system according to the present invention, no new arithmetic means are added to perform data correction coding or to perform corrections. By repeatedly applying the combination of maximum-likelihood sequence decoding and error data correction on the same readback signal, the reliability of the recording/readback data and the reliability of the information recording/readback system are significantly improved. The improved reliability in the data readback operation is provided by allowing reduced quality in the readback signal read from the information recording medium so that the information storage density in the recording/readback system can be increased. Also, by saving the readback signal temporarily in the storage readback system and repeatedly performing readback signal processing, the reliability of the readback data is improved, making it possible to avoid retries of reading readback signals from storage information media accompanied by mechanical information access operations. As a result, data processing efficiency is improved for the information recording/readback system.

The invention claimed is:

1. An information recording/readback circuit including:
   a maximum likelihood sequence decoding circuit receiving a readback signal sequence from a recorded information medium as input, performing conversion into a readback data code series corresponding to said recorded information, and outputting results of said conversion; and
   an error data detection/correction circuit receiving said converted readback data code series as input, checking for presence of decoding error data codes (readback data codes not corresponding to said recorded information) in said readback data code series, and correcting and outputting said detected decoding error data code as correct data code;
   wherein partial code information (code position and code values) of said readback data code sequence detected by said error data detection/correction circuit is fed back to said maximum-likelihood sequence decoding circuit as input; and
   said maximum-likelihood sequence decoding circuit uses said partial code information and repeatedly converts said readback signal sequence into said readback data code sequence, and
   wherein the repeated conversion in said maximum-likelihood sequence decoding circuit is done using the readback signal sequence corresponding to said recorded information again read from said recorded information medium (in retry mode).

2. An information recording/readback circuit according to claim 1, wherein the said partial code information (code values) are represented by soft-output information with multi-level values.

3. An information recording/readback circuit according to claim 1, wherein a code scrambling circuit is interposed between said maximum-likelihood decoder and said error data detection/correction circuit.

4. An information recording/readback circuit according to claim 1 wherein said partial code information fed back as input to said maximum-likelihood sequence decoding circuit is formed from information (code position and code value) relating to data determined by said error data detection/correction circuit not to contain decoding error data (correct data code) in said readback data series, or information (code position and corrected code values) relating to data for which decoding error data was found and corrected by said error data detection/correction circuit.

5. An information recording/readback circuit as described in claim 1 wherein said repeated conversion to said readback data code sequence by said maximum-likelihood sequence decoding circuit is performed when said error data detection/correction circuit finds decoding error data codes in said readback data code sequence and correction of all said detected decoding error data codes is not possible.

6. An information recording/readback circuit as described in claim 1 wherein:
   said readback data code series output from said maximum-likelihood sequence decoding circuit is divided into a plurality of code series; and
   said data detection/correction circuit detects error data codes and performs corrections on each of said plurality of code series independently.

7. An information recording/readback circuit as described in claim 1 wherein:
 said readback data code series output from said maximum-likelihood sequence decoding circuit is divided into a plurality of code series and sent separately into said a plurality of error data detector/corrector circuits for detection and correction of error data code, the results thereof being output from said error data detector/corrector circuits;
 when one of said plurality of error data detection/correction circuits outputs an indication that decoding error data code in an incoming code series cannot be corrected, a selector circuit selectively outputs part or all of code information from either an input signal for a data detection/correction circuit other than said error data detection/correction circuit or an output code series; and
 output from said selector circuit is sent to said maximum-likelihood circuit.

8. An information recording/readback circuit as described in claim 1 wherein:
 when said maximum-likelihood decoding circuit repeatedly performs conversion to a readback data code sequence, a partial code information fed back into said maximum-likelihood sequence decoding circuit is used and at least one of the following is performed:
 (1) a code series not matching said partial code information is eliminated from maximum-likelihood candidate code sequences, degrees of likelihood for said maximum-likelihood candidate code sequences are compared, and a readback data code sequence (maximum-likelihood sequence) corresponding to said readback signal sequence is selected; and
 (2) only code sequences matching said partial code information are set up as maximum-likelihood candidate code sequences, degrees of likelihood for said maximum-likelihood candidate code sequences are compared, and a readback data code sequence (maximum-likelihood sequence) corresponding to said readback signal sequence is selected.

9. An information recording/readback circuit as described in claim 1 wherein:
 when said maximum-likelihood decoding circuit repeatedly performs conversion to a readback data code sequence, a partial code information fed back into said maximum-likelihood sequence decoding circuit is used and at least one of the following is performed:
 (1) code sequences in which a code position (time) indicated in said code information being used does not contain a corresponding code value are eliminated from maximum-likelihood candidate code sequences, degrees of likelihood for said maximum-likelihood candidate code sequences are compared, and a readback data code sequence (maximum-likelihood sequence) corresponding to said readback signal sequence is selected; and
 (2) only code sequences in which a code position (time) indicated in said code information being used contains a corresponding code value are set up as maximum-likelihood candidate code sequences, degrees of likelihood for said maximum-likelihood candidate code sequences are compared, and a readback data code sequence (maximum-likelihood sequence) corresponding to said readback signal sequence is selected.

10. An information recording/readback circuit as described in claim 1 wherein:
 said maximum-likelihood decoding circuit selects a readback data code sequence (maximum-likelihood code sequence) using a Viterbi algorithm;
 when said maximum-likelihood decoding circuit repeatedly performs conversion to a readback data code sequence, a partial code information fed back into said maximum-likelihood sequence decoding circuit is used and at least one of the following is performed:
 (1) code sequences in which a code position (time) indicated in said code information being used does not contain a corresponding code value are eliminated from maximum-likelihood candidate code sequences, degrees of likelihood for said maximum-likelihood candidate code sequences are compared, and a readback data code sequence (maximum-likelihood sequence) corresponding to said readback signal sequence is selected; and
 (2) only code sequences in which a code position (time) indicated in said code information being used contains a corresponding code value are set up as maximum-likelihood candidate code sequences, degrees of likelihood for said maximum-likelihood candidate code sequences are compared, and a readback data code sequence (maximum-likelihood sequence) corresponding to said readback signal sequence is selected.

11. An information recording/readback circuit as described in claim 1 wherein:
 said maximum-likelihood decoding circuit selects/estimates a readback data code sequence (maximum-likelihood code sequence) using a predetermined code state transition diagram;
 when said maximum-likelihood decoding circuit repeatedly performs conversion to a readback data code sequence, a partial code information fed back into said maximum-likelihood sequence decoding circuit is used and at least one of the following is performed:
 (1) for a transition position (time) on said code state transition diagram corresponding to a code position (time) indicated by said code information being used, said readback data code sequence (maximum-likelihood code sequence) is selected/estimated using a code state transition diagram from which state transitions or code states not indicated by said code value are eliminated;
 (2) for a transition position (time) on said code state transition diagram corresponding to a code position (time) indicated by said code information being used, said readback data code sequence (maximum-likelihood code sequence) is selected/estimated using a code state transition diagram in which only state transitions or code states indicated by said code value are left.

12. An information recording/readback circuit as described in claim 1 further comprising a code interleaving circuit changing a code sequence of said readback data code series before said error data detection/correction circuit detects decode error data and performs correction.

13. An information recording/readback circuit as described in claim 1 wherein:
 said code interleaving circuit changing a code sequence of said readback data code series changes the sequence of said readback data code series using blocks of consecutive code having a predetermined length as units; and
 said code interleaving circuit changing the sequence in said readback data code series so that consecutive code blocks are separated.

14. An information recording/readback circuit as described in claim 1 wherein said code length of said code block is no more than a code length of a code block serving as a processing unit for detection and correction of decoded error data codes by said error data detecting/correcting means.

* * * * *